(12) United States Patent
Collett

(10) Patent No.: US 6,739,623 B2
(45) Date of Patent: May 25, 2004

(54) TRACTION ENHANCING SYSTEM FOR BOAT LAUNCHING AND RETRIEVAL

(76) Inventor: John C. Collett, 204 Harbor Dr., Georgetown, TX (US) 78628

( * ) Notice: Subject to any disclaimer, the term of this patent is extended or adjusted under 35 U.S.C. 154(b) by 108 days.

(21) Appl. No.: 10/082,813

(22) Filed: Feb. 25, 2002

(65) Prior Publication Data

US 2003/0160439 A1 Aug. 28, 2003

(51) Int. Cl.$^7$ ................................................. B60S 9/00
(52) U.S. Cl. ...................................................... 280/757
(58) Field of Search ............................... 280/757, 759; 296/37.6

(56) References Cited

U.S. PATENT DOCUMENTS

| | | | | | |
|---|---|---|---|---|---|
| 2,993,721 | A | * | 7/1961 | Bowman | 293/106 |
| 4,482,017 | A | * | 11/1984 | Morris | 169/24 |
| 5,181,760 | A | * | 1/1993 | Muno | 296/181 |
| 5,897,138 | A | * | 4/1999 | Hall | 280/759 |
| 6,027,139 | A | * | 2/2000 | Malinowski et al. | 280/759 |
| 6,302,464 | B1 | * | 10/2001 | Kubis et al. | 296/37.6 |
| 6,533,319 | B1 | * | 3/2003 | Denby et al. | 280/759 |
| 2002/0044835 | A1 | * | 4/2002 | Esposito et al. | 405/80 |
| 2002/0101069 | A1 | * | 8/2002 | Dombey | 280/759 |
| 2003/0047928 | A1 | * | 3/2003 | Gosselin | 280/759 |

* cited by examiner

*Primary Examiner*—Paul N. Dickson
*Assistant Examiner*—Laura B. Rosenberg
(74) *Attorney, Agent, or Firm*—David G. Henry

(57) ABSTRACT

The invention is of a vehicle traction enhancement system, primarily intended for use with boat towing vehicles for increasing the traction between the vehicles wheels and the driving surface (usually a "boat ramp") during boat launching and retrieval operations. The system includes a vehicle-mounted liquid holding tank and associated conduits and pump(s) for moving water into and out of the holding tank, respectively for increasing and decreasing weight of the vehicle as needed for traction requirements during and after boat launching and retrieval operations.

1 Claim, 1 Drawing Sheet

TRACTION ENHANCING SYSTEM FOR BOAT LAUNCHING AND RETRIEVAL

BACKGROUND OF THE INVENTION

1. Field of the Invention

The present invention relates to vehicle accessories and to boating and trailer equipment.

2. Background Information

Recreational boating and fishing involving boats represents a significant segment of the leisure time activities of Americans.

A very large number of boats in this country are carried to and from various lakes and rivers and launched and retrieved via boat ramps. A problem relating to such an operation is that boat ramps are often both steep and slick. This combination of conditions often leads to, at the very least, difficulty in managing a boat launch or retrieval due to the loss of traction by the towing vehicle.

In worse cases, accidents, and even loss of life can accompany a loss of traction, or the measures often used to prevent same.

An accident involving a boat launching or retrieval can happen in several different ways. A first involves the launching phase, and arises when a boat is backed into the water, down a steep, and perhaps slick boat ramp. Inexperience of the driver, a greater-than-expected pull of gravity tending to force the vehicle and boat trailer more rapidly rearward than expected, a mistake in managing the vehicle's accelerator, or simply a very slick surface of the boat ramp can, individually or in combination, cause the driver to be unable to stop the vehicle before it slides into the water, at least partially.

Another scenarios involves an attempt at retrieving the boat. Here again, at least some of the factors mentioned above can contribute to the driver losing the ability to move the vehicle, trailer and boat combination up the boat ramp, or even to prevent the same from sliding into the water.

A worst case scenario involves such a circumstance as just described, with one or more individuals standing on or near a rear bumper to increase traction (as is often seen at boating areas). The unpredictable reaction of the driver, combined with unexpected movements have been known to throw these "riders" from the vehicle and become caught as the vehicle slides into the water, with often catastrophic consequences.

Clearly, increasing weight of the vehicle, at least as is applied to the boat ramp through the rear wheels, is the best, most practical way to increase traction during a boat launch or retrieval operation. However, people should not be used as ballast for such operations. In addition, something which would provide effective weight to increase traction in any meaningful way would not likely be something that boaters would like to carry around with them.

In view of the above, it would well serve the interests of safety, and secondarily convenience, to provide some system or apparatus the use of which would have the effect of increasing traction between a boat towing vehicles rear wheels and a boat ramp. Such a system would ideally be one which does not involve transporting weighty objects or components to and from the boating location. Further still, substantially automatic operation would be a clear plus for such a system or apparatus.

SUMMARY OF THE INVENTION

In view of the above, it is an object of the present invention to provide a vehicle traction enhancement system.

It is another object of the present invention to provide a vehicle traction enhancement system for use with vehicles used for launching or retrieving boats via boat ramps.

It is another object of the present invention to provide a vehicle traction enhancement system for use with vehicles used for launching or retrieving boats via boat ramps, which system reversibly adds weight to the vehicle, affecting the pressure applied by the vehicle's rear wheels to a boat ramp during launching or retrieval operations.

It is another object of the present invention to provide a vehicle traction enhancement system for use with vehicles used for launching or retrieving boats via boat ramps, which system reversibly adds weight to the vehicle, affecting the pressure applied by the vehicle's rear wheels to a boat ramp during launching or retrieval operations, yet does not require the transport of heavy objects or components to and from boating sites.

In satisfaction of these and related objects, the present invention provides a vehicle traction enhancement system, primarily intended for use with boat towing vehicles for increasing the traction between the vehicles wheels and the driving surface (usually a "boat ramp") during boat launching and retrieval operations.

The present system involves a holding tank mounted in the truck bed or trunk of a towing vehicle. One or more pumps and suitable plumbing is used to draw water into the holding tank during boat launching or retrieval operations. Once the launching or retrieval operation is complete, the water is expelled from the holding tank, and only the weight of the tank and associates accessories is left to carry about.

Certain embodiments of the present invention involve automated features, such as automatic holding tank level regulators, actuation switches, etc. The basic system of the present invention, however, in order to fall within the scope of the present invention, need only have a holding tank or bladder, and associated pump and conduit means for introducing to and removing water from the holding tank as needed for boat launching and retrieval operations.

DETAILED DESCRIPTION OF THE PREFERRED EMBODIMENT

Figure 1:
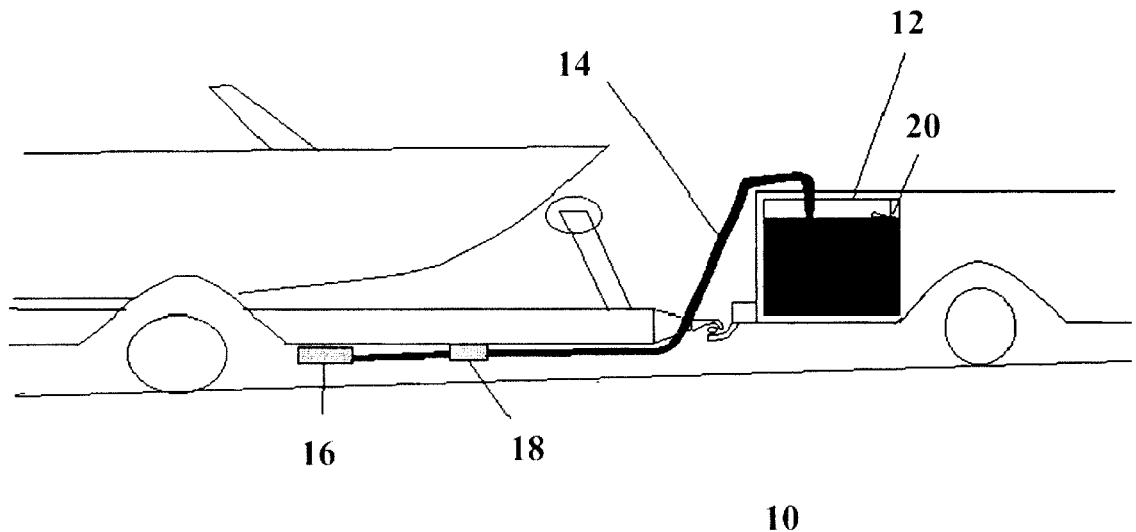
FIG. 1 is a schematic representation of a preferred embodiment of a vehicle traction enhancement system of the present invention.
Figure 2:
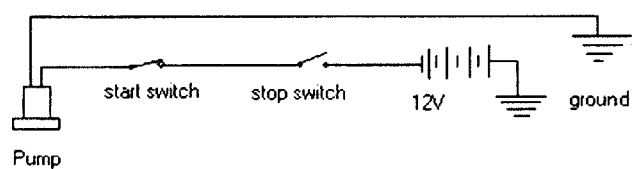
FIG. 2 is a schematic of one version of the circuitry for a system of the present invention.

Referring to FIG. 1, the basic components of a vehicle traction enhancement system 10 of the present invention includes a vehicle-mounted holding tank 12, a conduit 14 (in one or more segments, depending on placement of pumping device(s) and other accessories), and a pump 16.

When using any expected embodiment of the present invention, and the present system 10 is to be used to increase traction between a tow vehicle and a boat ramp, the boat trailer is lowered into the water (lake or river) sufficiently to allow the distal end of conduit 14 to become submerged in the water. Either through manual actuation of a manual switch (not shown in the drawings), or through automatic actuation via the first float switch 18 positioned substantially as shown in FIG. 1, pump 16 pumps water from the lake or river into holding tank 12 until it is either filled, or at least carries the amount of excess weight in water as is desired by the user. Once the holding tank 12 is filled to the literal or desired limit, the pump is stopped via the aforementioned manual switch, or through operation of a second float switch 20 which resides inside of holding tank 12.

In the most automated version of the present system 10, float switch 18 is mounted near the pump 16 and activates pump 16 only after it is fully submerged, while preventing its operation while not fully submerged.

Float switch 20 is, in the preferred embodiment, mounted upside-down inside holding tank 12, and is used to sense the level of water therein. Float switch 20 shuts off pump 16 when the desired amount of ballast water had been loaded.

An alternative embodiment of the present invention involves enclosing and sealing the holding tank, and adding an overflow tube (not shown in the drawings). The distance that the over-flow tube extended inside the holding tank 12, from the top of the holding tank 12, would determine the maximum water level achievable within the water container. This over-flow tube could be connected to a small box containing a float switch mounted upside-down. This box would have its' drainage rate determined by calibrated drain holes. This arrangement would allow water to be pumped into holding tank 12 until the level reached the over-flow tube. Water would travel down the tube until it entered the box. The box would fill, since the input rate of water would exceed the drainage rate determined by the total area of the drain holes. When the box fills, the float switch will interrupt the flow of power to pump 16. Water would cease flowing out overflow and the box would begin draining. When the water level inside the box had reached a predetermined level due to drainage, the power would be reapplied to pump 16 and the situation would repeat until the trailer was removed from the water. Using this method would alleviate the need to have electrical wiring attached to the holding tank 12.

To provide for the easiest, most automated operation possible, the first, proximal end of conduit 14 is positioned near the bottom of holding tank 12, with the second end being positioned at a lower position relative to a natural, vertical orientation, such as is shown in FIG. 1. With this arrangement in-place, the holding tank will automatically empty through a syphoning action once the trailer is sufficiently removed from the water as to expose the second, distal end of conduit 14.

The power to operate pump 16 would, in the preferred embodiment, come from the towing vehicle electrical system, or could be from a rechargeable battery mounted to the trailer.

For safety purposes, the holding tank 12 should obviously be securely mounted to prevent sudden shifts or dislodgement.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A vehicle traction enhancement system comprising:
   a liquid holding tank positioned within a motor vehicle for increasing weight near powered wheels of said motor vehicle;
   a conduit with first and second conduit ends, said first conduit end in fluid communication with an interior space of said holding tank, and said second conduit end being positioned for drawing liquid from a source outside of said motor vehicle and for syphoning fluid from said liquid holding tank when said second end is removed from said source;
   pumping means for moving liquid through said conduit into said interior space of said holding tank;
   reversible pump actuation means for actuating said pumping means when liquid is desired to be introduced into said holding tank for increasing weight of said vehicle and thereby increasing traction between said vehicle's tires and a surface upon which said vehicle rests or rolls.

* * * * *